United States Patent [19]

Bunte et al.

[11] Patent Number: 5,336,313
[45] Date of Patent: Aug. 9, 1994

[54] USE OF PARTIAL ESTERS OF OLIGOGLYCEROLS WITH FATTY ACIDS AS PIGMENT DISPERSANTS FOR WATER-BASED LACQUER DISPERSIONS

[75] Inventors: Reinhard Bunte, Dormagen; Wolfgang Gress, Wuppertal; Ulrich Nagorny, Hilden; Manfred Gorzinski, Duesseldorf, all of Fed. Rep. of Germany

[73] Assignee: Henkel Kommanditgesellschaft auf Aktien, Fed. Rep. of Germany

[21] Appl. No.: 776,318

[22] PCT Filed: Jun. 11, 1990

[86] PCT No.: PCT/EP90/00913
§ 371 Date: Dec. 16, 1991
§ 102(e) Date: Dec. 16, 1991

[87] PCT Pub. No.: WO90/15847
PCT Pub. Date: Dec. 27, 1990

[30] Foreign Application Priority Data

Jun. 20, 1989 [DE] Fed. Rep. of Germany ....... 3920130

[51] Int. Cl.$^5$ .............. C09D 11/06; C11C 3/00
[52] U.S. Cl. .................. 106/504; 106/401; 106/500
[58] Field of Search .............. 106/500, 401, 504

[56] References Cited

U.S. PATENT DOCUMENTS 4,271,051 6/1981 Eschwey .................. 554/149
4,332,587 6/1982 Kressner et al. ............ 106/27 R Primary Examiner—Helene Klemanski
Assistant Examiner—Scott Hertzog
Attorney, Agent, or Firm—Ernest G. Szoke; Wayne C. Jaeschke; Real J. Grandmaison

[57] ABSTRACT

The physical and chemical properties of a pigment-containing, water-based lacquer dispersion are improved by adding thereto a partial ester of an oligoglycerol obtained by condensation of 2 to 20 moles of glycerol with a $C_2$–$C_{18}$ fatty acid. The partial ester may be ethoxylated and/or propoxylated, and the fatty acid may be hydroxy substituted.

18 Claims, No Drawings

USE OF PARTIAL ESTERS OF OLIGOGLYCEROLS WITH FATTY ACIDS AS PIGMENT DISPERSANTS FOR WATER-BASED LACQUER DISPERSIONS

BACKGROUND OF THE INVENTION

Field of the Invention

This invention relates to the use of optionally ethoxylated and/or propoxylated partial esters of oligoglycerols obtainable by condensation of 2 to 20 glycerol molecules with optionally hydroxy-substituted $C_{2-18}$ fatty acids as pigment dispersants for water-based lacquer dispersions.

Discussion of Related Art

Partial esters of oligoglycerols obtainable by condensation of 2 to 20 glycerol molecules with fatty acids are known, cf. Fette, Seifen, Anstrichmittel, Vol. 88, pages 101 to 106 (1986); DE-C 25 11 807. These partial esters are often used as internal lubricants and/or antistatic additives for plastics.

Anionic dispersants are frequently used as pigment dispersants for water-based lacquer dispersions, as are nonionic dispersants based on adducts of ethylene oxide and/or propylene oxide with compounds containing active hydrogen atoms, cf. H. Kittel (ed.), Lehrbuch der Lacke und Beschichtungen, Vol. III, pp. 250 to 258, Verlag W. A. Colomb, Berlin (1976), or low molecular weight polyacrylic acid salts, cf. DE-A 3,318,595.

However, the use of the known dispersants in water-based lacquer dispersions is attended by various disadvantages. More particularly, unwanted foaming occurs to an increased extent in the water-based lacquer dispersions.

DESCRIPTION OF THE INVENTION

Other than in the operating examples, or where otherwise indicated, all numbers expressing quantities of ingredients or reaction conditions used herein are to be understood as modified in all instances by the term "about".

The present invention is based on the observation that the above-mentioned optionally ethoxylated and/or propoxylated partial esters of oligoglycerols obtainable by condensation of 2 to 20 glycerol molecules with optionally hydroxy-substituted $C_{2-18}$ fatty acids have little, if any, effect on the foaming behavior of the water-based lacquer dispersions. In addition, the partial esters improve the stability of the water-based lacquer preparations in storage and have little effect on their viscosity behavior. Finally, the partial esters have an excellent wetting effect which is reflected in high gloss levels of the dried lacquer films. Finally, there is a noticeable improvement in resistance to methyl ethyl ketone and in the mechanical properties, particularly in the case of water-based alkyd resin preparations, by comparison with low molecular weight polyacrylic acid salts as pigment dispersants. In addition, water-based lacquer preparations, particularly where they contain alkyd resins, perform as well as corresponding state-of-the-art lacquers in the condensation and salt spray testing of metal plates coated with the lacquer dispersions.

The partial esters to be used in accordance with the invention are prepared from oligoglycerols—obtainable by condensation of 2 to 20 glycerol molecules—as the alcohol component, oligoglycerols synthesized formally from 3 to 10 and more particularly from 4 to 6 glycerol molecules being preferred for the production of the partial esters. Technical grade mixtures of the oligoglycerols having the stated chain lengths may also be used. Oligoglycerols obtainable by other methods are also suitable for the preparation of the partial esters, cf. the above-cited literature reference in Fette, Seifen, Anstrichmittel (1986).

To prepare the partial esters to be used in accordance with the invention, the oligoglycerols mentioned above are partly esterified with optionally hydroxy-substituted $C_{2-18}$ fatty acids, the partial esters preferably containing at least one and, more preferably, at least two free hydroxyl groups in the oligoglycerol part. Suitable fatty acids are linear or branched, more particularly linear, saturated or unsaturated fatty acids containing 2 to 18 carbon atoms. Typical examples of such fatty acids are acetic acid, propionic acid, valeric acid, caproic acid, caprylic acid, capric acid, lauric acid, myristic acid, paimitic acid, isopalmitic acid, stearic acid, isostearic acid, palmitoleic acid, oleic acid, ricinoleic acid, linoleic acid, linolenic acid and 12-hydroxystearic acid. Dihydroxyfatty acids, such as dihydroxystearic acid, hydroxyalkoxy-substituted and hydroxyhydroxyalkoxy-substituted fatty acids are also suitable. Compounds such as these may be obtained from epoxidized fats and oils in known manner by ring-opening with water or monohydric and polyhydric alcohols, such as for example methanol, ethanol, ethylene glycol, glycerol or pentaerythritol, and subsequent saponification of the glycerides. Preferred fatty acid components are optionally hydroxy-substituted, linear $C_{12-18}$ fatty acids from the above list. As usual in oleochemistry, the fatty acids may be used in the form of technical grade mixtures for the production of the partial esters mentioned.

After their preparation, the partial esters obtainable from the above-mentioned oligoglycerols and fatty acids may be modified by addition of ethylene oxide and/or propylene oxide (in random or block distribution of the alkylene oxide units). Typically, 1 to 30 mol ethylene oxide are added per mol partial ester. In the addition of propylene oxide, it is important to monitor the solubility in water of the modified partial esters obtained which decreases with increasing content of propylene oxide groups in the case of partial esters of higher oligoglycerols, for example of 10 or more condensed glycerol molecules, up to 30 propylene oxide units can be added on. In the case of partial esters of relatively short-chain oligoglycerols, for example of 3 to 10 condensed glycerol molecules, generally no more than 1 to 3 propylene oxide groups are added on.

The partial esters to be used in accordance with the invention also include products obtainable by initially reacting the oligoglycerols used as starting material with ethylene oxide and/or propylene oxide and then esterifying the product of this reaction with the selected fatty acids. The foregoing observations on partial esters also apply in this case.

The optionally ethoxylated and/or propoxylated partial esters to be used in accordance with the invention are suitable as pigment dispersants for typical pigment-containing, water-based lacquer dispersions, for example water-based dispersions of dispersible polymers, such as acrylates, methacrylates, polyurethanes, polyvinyl acetate, natural and synthetic rubbers and the like. They are particularly suitable for lacquer dispersions based on aqueous alkyd resin dispersions of the type described in detail in Ullmann's Encyclopedia of Industrial Chemistry, Vol. A1, pages 409 to 423. Particularly preferred water-based alkyd resin dispersions contain hydroxyl-functional alkyd resins and are described in DE-A 3,318,595, to the overall disclosure of which reference is hereby made.

In another advantageous embodiment of the invention, the optionally ethoxylated and/or propoxylated partial esters of the above-mentioned type are used in a quantity of 0.2 to 100% by weight and preferably in a quantity of 0.2 to 10% by weight, based on pigments present in the water-based lacquer preparations.

The present invention also relates to water-based lacquer dispersions, more particularly based on alkyd resins, containing optionally ethoxylated and/or propoxylated partial esters of the above-described type as pigment dispersants.

The invention is illustrated by the following Examples.

EXAMPLE 1

Production of a white test lacquer:
The following components are introduced into a stirred apparatus:
113.0 parts by weight demineralized water 3.5 parts by weight pentaglycerol monolaurate
210.0 parts by weight titanium dioxide 1.0 part by weight foam inhibitor (10% aqueous solution of a commercially available ethoxylated polysiloxane).

The following components were added with intensive stirring:
295.0 parts by weight of the water-based alkyd resin preparation according to DE-A 3 318 595, Example x;
4.0 parts by weight dimethyl ethanolamine (neutralizing agent for the alkyd resin)
319.9 parts by weight demineralized water
83.6 parts by weight hexamethoxymethyl melamine (curing aid).

EXAMPLE 2

The procedure was as in Example 1, except that the pentaglycerol monolaurate was replaced by the same quantity of pentaglycerol dioleate as pigment dispersant.

EXAMPLE 3

Production of a black test lacquer:
The following components were mixed in the same way as described in Example 1:
50.0 parts by weight demineralized water
1.8 parts by weight dimethyl ethanolamine
10.7 parts by weight hexamethoxymethyl melamine
40.0 parts by weight carbon black
4.5 parts by weight highly disperse silicon dioxide
45.0 parts by weight barium sulfate
3.5 parts by weight pentaglycerol dioleate.

The following components were added to the resulting mixture:
321.1 parts by weight of the water-based alkyd resin preparation according to DE-A 3,318,595, Example 3
4.0 parts by weight dimethyl ethanolamine
407.0 parts by weight demineralized water
106.4 parts by weight hexamethoxymethyl melamine
2.0 parts by weight foam inhibitor (10% aqueous solution of a commercially available ethoxylated polysiloxane).

EXAMPLE 4

The procedure was as in Example 3, except that the pentaglycerol monolaurate was replaced by pentaglycerol dioleate as pigment dispersant.

COMPARISON EXAMPLES

Water-based lacquer dispersions were prepared in the same way as in Examples 1 to 4 except that the pentaglycerol monooleate and pentaglycerol dioleate were replaced by the same quantities, based on the active-substance content, of a commercially available nonionic dispersant preparation (adduct of approx. 10 mol ethylene oxide with nonylphenol; Disponil ® 286, a product of Henkel KGaA), an anionic dispersant (Additol ® XL 250, a product of Hoechst) and a polyacrylic acid salt according to DE-A 3,318,595, Example 3.

The lacquers obtained as described above were sprayed onto steel plates and stored for 15 minutes at 160° C. The dry film thicknesses were between 25 and 40 micrometers. The test results obtained with the lacquer coatings are set out in Tables 1 and 2. The test results obtained with the formulations of the Comparison Examples are also included in the Tables.

TABLE 1

| | White lacquer | | | | |
|---|---|---|---|---|---|
| Dispersant | Nonionic[1] | Anionic[2] | Polyacrylic acid salt[3] | Example 1 | Example 2 |
| Values | | | | | |
| Viscosity, mPa · s | 975 | 520 | 340 | 530 | 480 |
| Gloss 60° ≮ | 52% | 80% | 89% | 77% | 79% |
| Pendulum hardness, secs. | 133 | 128 | 131 | 131 | 120 |
| Crosshatch | 2 | 2 | 4 | 2 | 2 |
| Impact test reserve inch pound | =40 | =40 | =40 | >40 | >40 <70 |
| Condensation test | 240 h m1/g1 | 240 h m0/g0 | 240 h m0/g0 | 240 h m0/g0 | 240 h m0/g0 |
| Salt spray test[4] | 96 h | 96 h | 96 h | 96 h | 96 h |
| MEK test[5] wipes | 140 | 140 | 140 | 160 | >170 |

TABLE 1-continued

| | White lacquer | | | | |
|---|---|---|---|---|---|
| Dispersant | Nonionic[1] | Anionic[2] | Polyacrylic acid salt[3] | Example 1 | Example 2 |
| Appearance after storage for 30 days at 23° C. | 1–2 mm serum formation at the surface | Approx. 50% serum formation, readily homogenizable | Approx. 5 mm serum formation | 1–2 mm serum formation at the surface | 1–2 mm serum formation at the surface |

[1] Disponil ® 286
[2] Additol XL 250
[3] DE-A 3 318 595, Example 3
[4] Acc. to DIN SK 50017, 53209
[5] MEK = methyl ethyl ketone

TABLE 2

| | Black lacquer | | |
|---|---|---|---|
| Dispersant | Polyacrylic acid salt[1] | Example 3 | Example 4 |
| Values | | | |
| Viscosity, mPa · s | 850 | 960 | 960 |
| Gloss, 60° ⪅ | 82% | 83% | 82% |
| Pendulum hardness, secs. | 145 | 145 | 152 |
| Cross-hatch | 2–3 | 2 | 2 |
| Impact test reserve inch pound | <70 | =70 | =70 |
| Condensation test | 240 h m0/g0 | 240 h m0/g0 | 240 h m0/g0 |
| Appearance after storage for 30 days at 23° C. | 2–3 mm serum formation | 2–3 mm serum formation | 2–3 serum formation |

[1] DE-A 3 318 595, Example 3

We claim:

1. The process of dispersing pigment particles in a pigment-containing, water-based lacquer dispersion, consisting essentially of adding to said dispersion from about 0.2 to about 100% by weight, based on the weight of said pigment particles, of a partial ester of a $C_2$–$C_{18}$ fatty acid with an oligoglycerol obtained by condensation of about 2 to about 20 moles of glycerol.

2. The process as in claim 1 wherein said partial ester is ethoxylated or propoxylated.

3. The process as in claim 1 wherein said fatty acid is hydroxy-substituted.

4. The process as in claim 1 wherein said partial ester contains at least one free hydroxyl group in said oligoglycerol.

5. The process as in claim 1 wherein said partial ester is obtained by condensation said fatty acid with an oligoglycerol having of said fatty acid with an oligoglycerol having about 3 to about 10 moles of glycerol.

6. The process as in claim 1 wherein said lacquer dispersion consists essentially of an alkyd resin dispersion.

7. The process as in claim 6 wherein said lacquer dispersion consists essentially of a hydroxyl-functional alkyd resin dispersion.

8. The process as in claim 1 wherein said partial ester is present in an amount of from about 0.2 to about 10% by weight, based on the weight of said pigment particles.

9. The process as in claim 1 wherein said partial ester contains from about 1 to about 30 moles of ethylene oxide or propylene oxide.

10. A water-based lacquer dispersion containing pigment particles, and as a dispersant for said pigment particles, from about 0.2 to about 100% by weight, based on the weight of said pigment particles, of a partial ester of a $C_2$–$C_{18}$ fatty acid with an oligoglycerol, said oligoglycerol obtained by condensation of about 2 to about 20 moles of glycerol.

11. A lacquer dispersion as in claim 10 wherein said partial ester is ethoxylated or propoxylated.

12. A lacquer dispersion as in claim 10 wherein said fatty acid is hydroxy-substituted.

13. A lacquer dispersion as in claim 10 wherein said partial ester contains at least one free hydroxyl group in said oligoglycerol.

14. A lacquer dispersion as in claim 10 wherein said partial ester is obtained by condensation of said fatty acid with an oligoglycerol having about 3 to about 10 moles of glycerol.

15. A lacquer dispersion as in claim 10 wherein said lacquer dispersion consists essentially of an alkyd resin dispersion.

16. A lacquer dispersion as in claim 15 wherein said lacquer dispersion consists essentially of a hydroxyl-functional alkyd resin dispersion.

17. A lacquer dispersion as in claim 10 wherein said partial ester is present in an amount of from about 0.2 to about 10% by weight, based on the weight of said pigment particles.

18. A lacquer dispersion as in claim 10 wherein said partial ester contains from about 1 to about 30 moles of ethylene oxide or propylene oxide.

* * * * *

UNITED STATES PATENT AND TRADEMARK OFFICE
CERTIFICATE OF CORRECTION

PATENT NO. : 5,336,313
DATED : August 9, 1994
INVENTOR(S) : Bunte et. al.

It is certified that error appears in the above-indentified patent and that said Letters Patent is hereby corrected as shown below:

In claim 5, column 5, line 58, delete:
-- said fatty acid with an oligoglycerol having --.

Signed and Sealed this

Thirtieth Day of May, 1995

Attest:

BRUCE LEHMAN

Attesting Officer    Commissioner of Patents and Trademarks